0

United States Patent
Palvoelgyi et al.

(10) Patent No.: US 11,022,203 B2
(45) Date of Patent: Jun. 1, 2021

(54) DRIVE ARRANGEMENT

(71) Applicant: MAGNA Auteca GmbH, Weiz (AT)

(72) Inventors: Martin Palvoelgyi, Markt Hartmannsdorf (AT); Bernhard Schadler, Gersdorf an der Feistritz (AT)

(73) Assignee: Magna Auteca, Krottendorf bei Weiz (AT)

( * ) Notice: Subject to any disclaimer, the term of this patent is extended or adjusted under 35 U.S.C. 154(b) by 0 days.

(21) Appl. No.: 16/158,365

(22) Filed: Oct. 12, 2018

(65) Prior Publication Data

US 2019/0136948 A1 May 9, 2019

(30) Foreign Application Priority Data

Nov. 8, 2017 (EP) ..................................... 17200603

(51) Int. Cl.
| | |
|---|---|
| *F16H 35/10* | (2006.01) |
| *F16H 1/16* | (2006.01) |
| *F16H 1/20* | (2006.01) |
| *F16H 57/02* | (2012.01) |
| *F16H 35/00* | (2006.01) |

(Continued)

(52) U.S. Cl.
CPC ........... *F16H 35/10* (2013.01); *B62D 35/007* (2013.01); *B62D 37/02* (2013.01); *F16D 7/044* (2013.01);
(Continued)

(58) Field of Classification Search
CPC . F16H 35/10; F16H 1/16; F16H 1/203; F16H 1/225; F16H 1/206; F16H 57/02; F16H 57/021; F16H 57/039; F16H 2035/005; F16H 2057/02034; B62D 35/007; B62D 35/00; B62D 35/005;
(Continued)

(56) References Cited

U.S. PATENT DOCUMENTS 5,636,071 A * 6/1997 Mochizuki .............. B60R 1/074
248/476
9,194,481 B2 * 11/2015 Oberle .................. F16H 37/041
(Continued)

FOREIGN PATENT DOCUMENTS

| | | | |
|---|---|---|---|
| DE | 19520656 A1 | 2/1996 | |
| DE | 102012024113 A1 * | 6/2014 | ............. H02K 7/116 |

(Continued)

OTHER PUBLICATIONS

EPO Office Action for EP Patent Application No. 17 200 603.3 (dated Mar. 10, 2020).
(Continued)

*Primary Examiner* — Luis A Gonzalez
(74) *Attorney, Agent, or Firm* — Jordan IP Law, LLC; Todd A. Vaughn

(57) ABSTRACT

A drive arrangement for adjusting an aerodynamic flap on a vehicle. The drive arrangement includes an electric motor, a spur gear mechanism having gear stages, an output shaft, and at least two housing halves. The spur gear mechanism includes at least one self-locking gear stage that does not form the first gear stage nor the last gear stage of the spur gear mechanism. A safety coupling is arranged between the self-locking gear stage and the output shaft to disengage the output drive on overload in order to protect the flap attached thereto from damage.

17 Claims, 6 Drawing Sheets

(51) Int. Cl.
*B62D 37/02* (2006.01)
*F16D 43/202* (2006.01)
*F16H 37/04* (2006.01)
*F16D 7/04* (2006.01)
*B62D 35/00* (2006.01)
*H02K 7/116* (2006.01)

(52) U.S. Cl.
CPC ......... *F16D 43/2024* (2013.01); *F16H 1/203* (2013.01); *F16H 35/00* (2013.01); *F16H 37/042* (2013.01); *F16H 57/02* (2013.01); *H02K 7/1166* (2013.01); *F16H 1/16* (2013.01); *F16H 2035/005* (2013.01); *F16H 2057/02034* (2013.01)

(58) Field of Classification Search
CPC .... B62D 35/008; B62D 37/02; H02K 7/1166; H02K 7/116
See application file for complete search history.

(56) References Cited

U.S. PATENT DOCUMENTS

| | | | |
|---|---|---|---|
| 9,243,700 B1 | 1/2016 | DeBoth | |
| 10,005,501 B2* | 6/2018 | Povinelli | B62D 33/03 |
| 10,274,027 B2* | 4/2019 | Matthews | F16D 43/2024 |
| 2006/0022108 A1 | 2/2006 | Kuga | |
| 2019/0154117 A1* | 5/2019 | Herrmann | F16H 1/225 |

FOREIGN PATENT DOCUMENTS

| | | |
|---|---|---|
| DE | 102014223081 A1 | 1/2016 |
| GB | 2424249 A | 9/2006 |
| JP | S62-161559 U | 10/1987 |
| JP | 2002-323094 A | 11/2002 |
| JP | 2004-84697 A | 3/2004 |
| JP | 2004-109392 A | 4/2004 |
| JP | 2016-528861 A | 9/2016 |
| JP | 2017-163725 A | 9/2017 |
| WO | 2011079981 A1 | 7/2011 |
| WO | 2012/117781 A | 7/2014 |

OTHER PUBLICATIONS

Notice of Reasons for Allowance, Japan Patent Office, (dated Nov. 5, 2019).

* cited by examiner

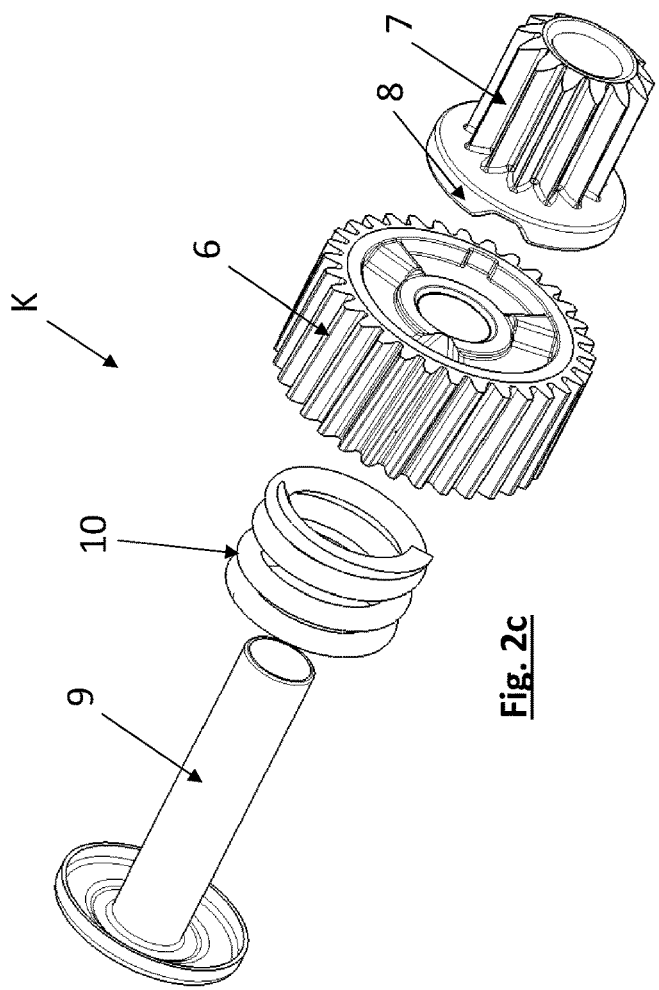
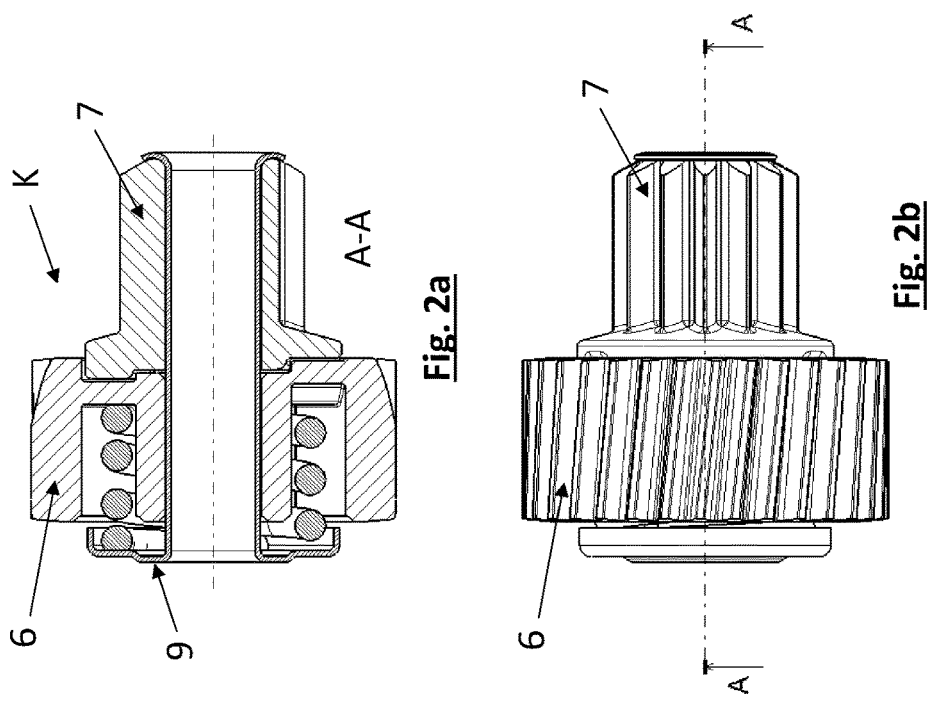

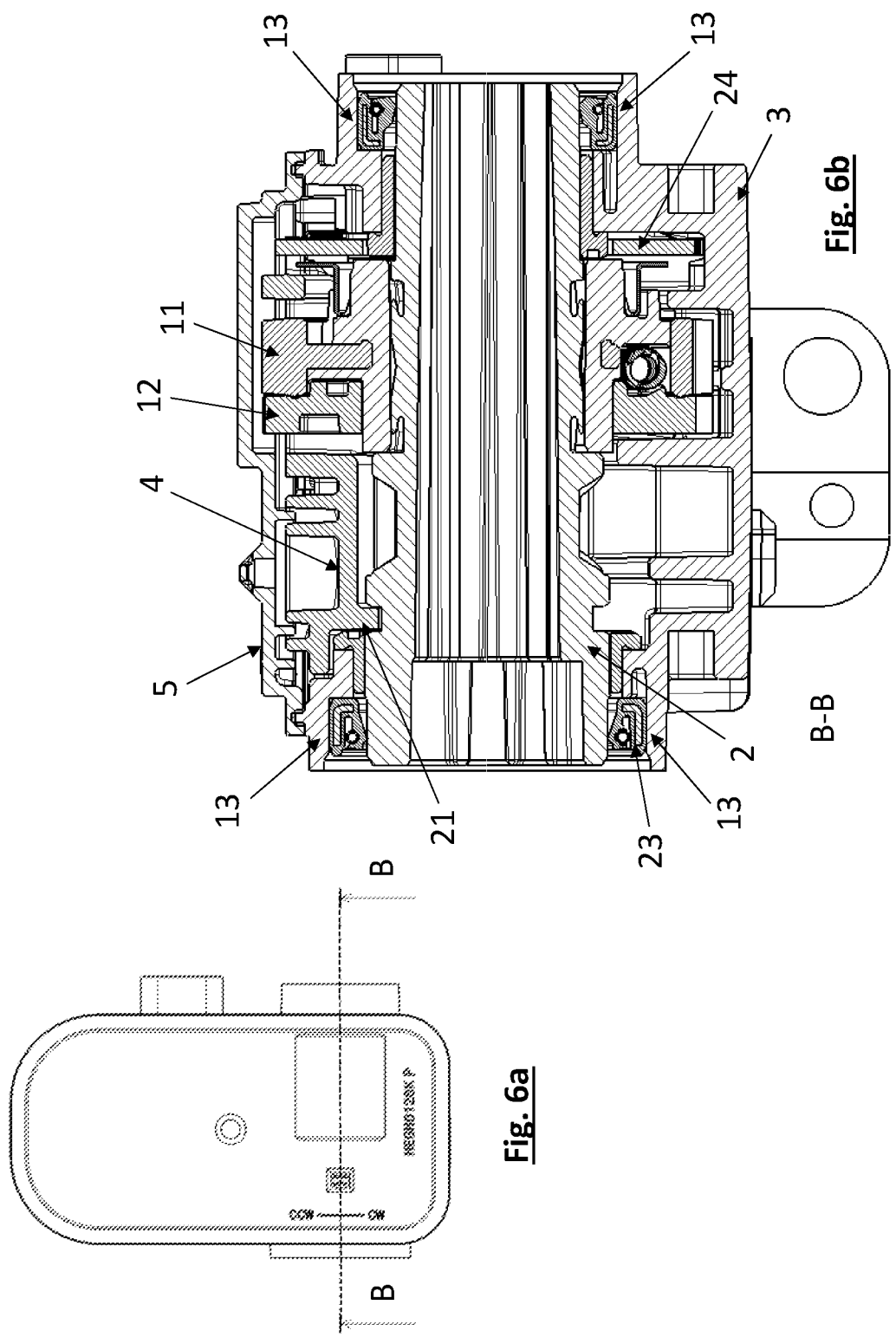

DRIVE ARRANGEMENT

CROSS-REFERENCE TO RELATED APPLICATIONS

The present application claims priority 35 U.S.C. § 119 to European Patent Publication No. EP 17200603.3 (filed on Nov. 8, 2017), which is hereby incorporated by reference in its entirety.

TECHNICAL FIELD

Embodiments relate to a drive arrangement for adjusting an aerodynamic flap on a vehicle.

BACKGROUND

With the aim of improving the efficiency of motor vehicles, increasingly efforts are made to actively change the aerodynamics of the vehicle. To this end, parts of the vehicle outer surface (flaps, spoiler, diffusor etc.) are adjusted electrically according to travel speed in order to favourably influence the air flow around the vehicle.

The exposed position of the drives required for this necessitates a water-tight housing. Frequently therefore, housings which are welded closed are used.

In order to be able to hold the adjusted flap against the travel wind as efficiently as possible, preferably self-locking gear mechanisms are used. In this case, the drive may have a safety coupling which disengages the output drive on overload in order to protect the flap attached thereto from damage.

Such a drive is described in publication WO 2014 205 217 A1.

To achieve the necessary high output moments in such drive arrangements, usually multistage gear mechanisms are used with at least one self-locking stage. A common design is a two-stage worm gear mechanism. The advantage of this design is the low number of components, but the great disadvantage is the poor gear efficiency and correspondingly large electric motors.

It is already known that the output shaft is preferably separable from the remaining gear mechanism via a safety coupling. The disadvantage of this known arrangement however is that the coupling requires considerable installation space should large release moments are required.

SUMMARY

Embodiments relate to a drive arrangement for adjusting aerodynamic flaps on a motor vehicle, which avoids the above-mentioned disadvantages, and in particular, has a high efficiency while requiring little installation space.

In accordance with embodiments, a drive arrangement for adjusting an aerodynamic flap on a vehicle may comprise an electric motor, a multistage gear mechanism, an output shaft and at least two housing halves, wherein the gear mechanism comprises spur gears and at least one self-locking gear stage, wherein the self-locking gear stage forms neither the first nor the last gear stage of the gear mechanism.

In accordance with embodiments, a drive is provided for adjusting aerodynamic flaps on a motor vehicle, and which comprises an electric motor with a multistage gear mechanism, in particular, a spur gear mechanism which therefore forms several gear stages, and a self-locking stage. This design allows maximum efficiency. The self-locking gear stage forms neither the first nor the last gear stage of the gear mechanism. By installing a self-locking gear stage within the stages of the gear mechanism, an optimum ratio can be achieved between the necessary coupling size and coupling moment fluctuations.

In this way, a safety coupling can be accommodated between the self-locking stage and the final stage of the multistage gear mechanism. With this arrangement, the coupling moment to be transmitted is reduced by the factor of the last gear ratio. The coupling therefore requires little installation space and facilitates an output wheel and an output shaft. In principle, the safety coupling could be arranged at a gear position even closer to the motor, in particular, should the self-locking gear stage were the first gear stage of the drive device. This could further reduce the size of coupling but the fluctuations in coupling moment would then be amplified via all downstream translation ratios and the coupling moment at the output drive would therefore be imprecise. The self-locking gear stage, therefore, forms neither the first nor the last gear stage of the spur gear mechanism.

Refinements of the invention are given in the dependent claims, the description and the attached drawings.

In accordance with embodiments, the self-locking gear stage forms the penultimate gear stage, wherein the last gear stage, particularly, is again configured with spur gears.

In accordance with embodiments, a safety coupling is arranged between the self-locking gear stage and the output shaft, in particular, between the self-locking gear stage and an output wheel which is rotationally fixed to the output shaft. Such a safety coupling may disengage the output drive on overload in order to protect the flap attached thereto from damage.

In accordance with embodiments, at least one gear stage is provided between the safety coupling and the output shaft, in particular, between the safety coupling and the output wheel.

In accordance with embodiments, the drive arrangement comprises a double gear wheel that includes a large gear wheel and a small gear wheel coaxial to the large gear wheel, and a safety coupling to act between the large gear wheel and the small gear wheel. In particular, the safety coupling may comprise two gear wheels which are mutually connected via a locking contour and are situated on a sleeve and pressed against each other by a compression spring. The sleeve can rotate freely on a fixed shaft.

In accordance with embodiments, an output wheel, which is rotationally fixed to the output shaft, is equipped with a spring-loaded pretension wheel which protects the tooth flanks of the last gear stage from hard impacts on fluctuating loads. The rotation angle of the output drive, in particular of the output shaft or an output wheel which is rotationally fixed to the output shaft, may be detected by measurement.

In accordance with embodiments, the bearing points of the output shaft are fully enclosed solely by one of the housing parts. A problem of similar drive arrangements is the fact that gear forces, here above all the high forces occurring on disengagement of the safety coupling, are conducted into housing parts which are welded together, and the force flow runs via the weld seam. There is therefore a risk of rupture of the seam and a loss of seal of the drive, or in the worst case even breakage of the drive. The output shaft, therefore, is fully enclosed by one of the housing parts so that the forces need not be absorbed in joining zones of the housing parts.

In accordance with embodiments, at least one gear shaft of a gear stage is pressed into one housing half and at least all radial forces acting on the shaft are borne by this housing part alone. The housing half in which the gear shaft is pressed is preferably the same as that which supports the output shaft.

DRAWINGS

Embodiments will be illustrated by way of example in the drawings and explained in the description below.

FIG. 2a illustrates a sectional view, showing a section A-A of FIG. 2b, of a safety coupling of a drive arrangement, in accordance with embodiments.

FIG. 2b illustrates the position of the section plane A-A of FIG. 2a in a safety coupling.

FIG. 2c illustrates a three-dimensional, exploded view of the safety coupling of FIGS. 2a and 2b.

FIG. 6a illustrates the position of the section plane B-B of FIG. 6b in a drive arrangement, in accordance with embodiments.

FIG. 6b illustrates a sectional view, showing a section B-B of FIG. 6a, of a drive arrangement, in accordance with embodiments.

DESCRIPTION

Figure 1:
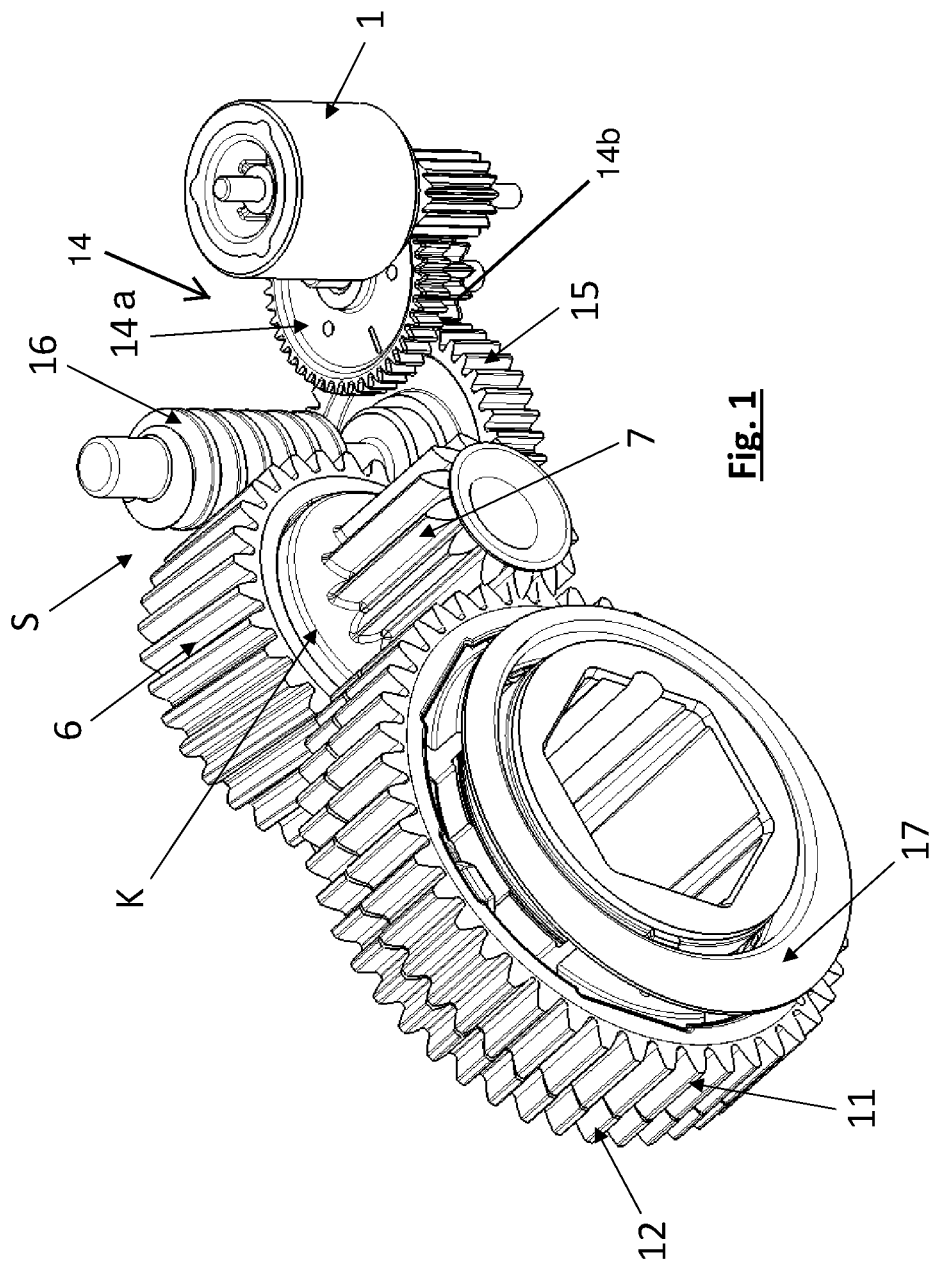
FIG. 1 illustrates a three-dimensional depiction of a gear mechanism of a drive arrangement, in accordance with embodiments.

FIG. 1 illustrates a gear mechanism of a drive arrangement in accordance with embodiments. The rotor of the drive motor 1 rotates on a stationary shaft. A first toothing is formed on the hub of the rotor and is connected to a corresponding toothing of the first gear wheel 14. The first gear wheel 14 is a double gear wheel which is driven at a first spur gear 14a (having a first diameter), and via a coaxial second spur gear 14b (having a second diameter that is less than the first diameter) drives a spur gear 15 of the worm gear, which is operatively connected to a worm screw 16.

The worm screw 16 and the worm gear engaged therewith, namely a second gear wheel 6, form the self-locking gear stage S. Instead of a worm gear stage, a different self-locking stage may be used in accordance with embodiments such as, for example, an eccentric gear mechanism or similar arrangement.

The second gear wheel 6 and a third gear wheel 7 (having a diameter that is less than that of the second gear wheel 6) are operatively connected together via a safety coupling K (illustrated in detail in FIGS. 2a through 2c). The third gear wheel 7 meshes with the output wheel 11. If a certain moment is exceeded at the output wheel 11, the safety coupling K is to disengage and the output wheel 11 and third gear wheel 7 are to be freely rotatable.

A contoured plate 17, composed of a metal material, is pressed onto the face of the output wheel 11. On a rotational movement of the output wheel 11. The plate 17 is to move over a coil installed in a circuit board, and is to thereby change the inductance of the coil. This inductance change may be used to determine the rotation angle of the output wheel 11.

Furthermore, a spring-loaded pretension wheel 12 is arranged on the output wheel 11. The use of such pretension wheels is known in itself for the purposes of noise reduction, vibration reduction etc. The purpose of the pretension wheel 12 in this case is to reduce the knocking of the tooth flanks of the final stages. Excessive tooth play and greatly fluctuating loads lead to hard impacts of the tooth flanks. In the worst case, plastic deformation of the tooth flanks can occur, with a further increase in tooth play. A self-amplifying mechanism is set in motion, which can rapidly lead to destruction of the gears.

FIG. 2 illustrates the safety coupling K between the second gear wheel 6 and the third gear wheel 7, three-dimensionally in FIG. 2c, and as a cross-section A-A in FIG. 2b as indicated in FIG. 2a. The second gear wheel 6 and the third gear wheel 7 have an intermeshing locking contour 8 and are pressed against each other by a compression spring 10. On production of the coupling K, the spring 10 is compressed to a desired dimension and a sleeve 9 is mounted (e.g., riveted) on the side of the third gear wheel 7. In normal operation, a torque may be transmitted between the second gear wheel 6 and the third gear wheel 7 via the locking contours 8, and the coupling K rotates with the sleeve 9 on a pin fixed in the housing, namely a coupling shaft 22 (See, FIG. 4).

If excessive moment is applied at the output drive, the second gear wheel 6 is prevented from turning by the worm screw 16. The lock contours 8 now force the second gear wheel 6 axially against the spring 10 until the locking contours 8 no longer intermesh. The third gear wheel 7 and the sleeve 9 may now rotate freely while the second gear wheel 6 is stationary, until the coupling K re-engages. The advantage of this design is the fact that the coupling mechanism K does not create any additional gear play. Similar coupling mechanisms often carry one coupling side on a splined shaft, wherein this connection must be provided with corresponding play in order to guarantee movability.

Figure 3:
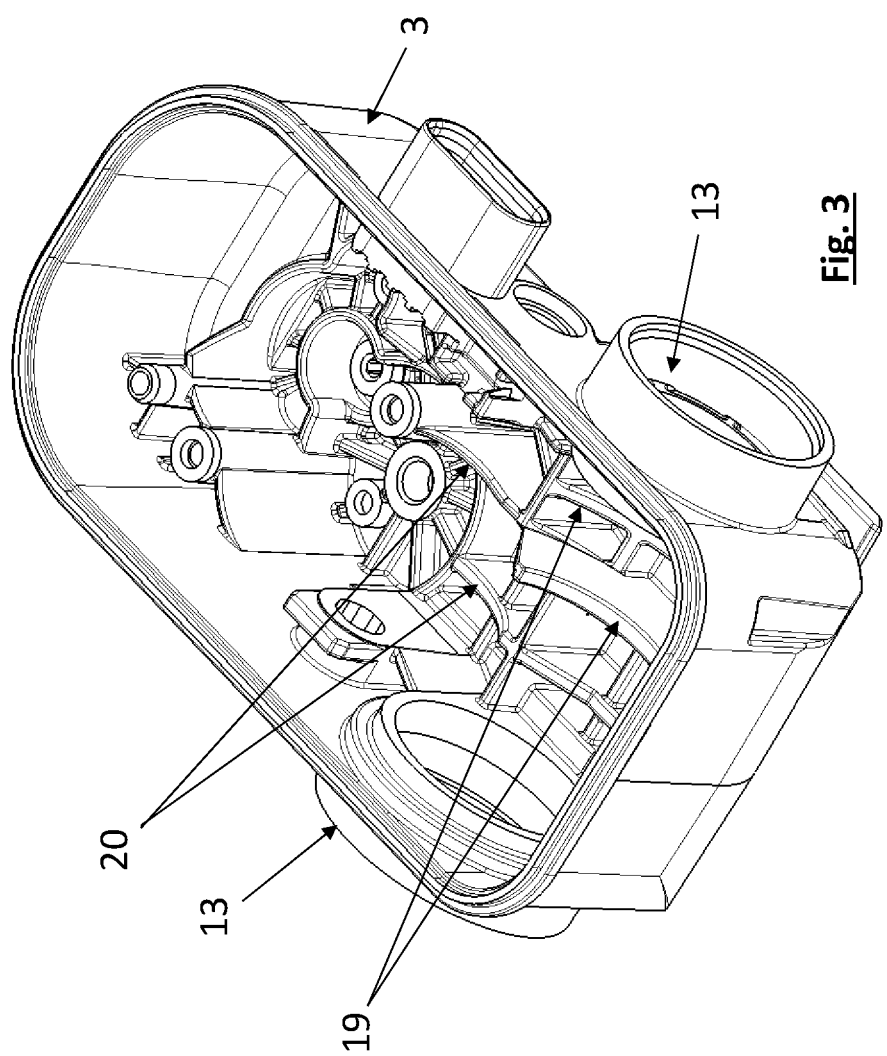
FIG. 3 illustrates three-dimensionally a lower housing for a drive arrangement, in accordance with embodiments.

FIG. 3 illustrates an oblique view of a lower housing 3 having ribs 19, 20 arranged therein so that the coupling K and the output wheel 11 may be placed in the lower housing 3 and pre-positioned for later installation.

Figure 4:
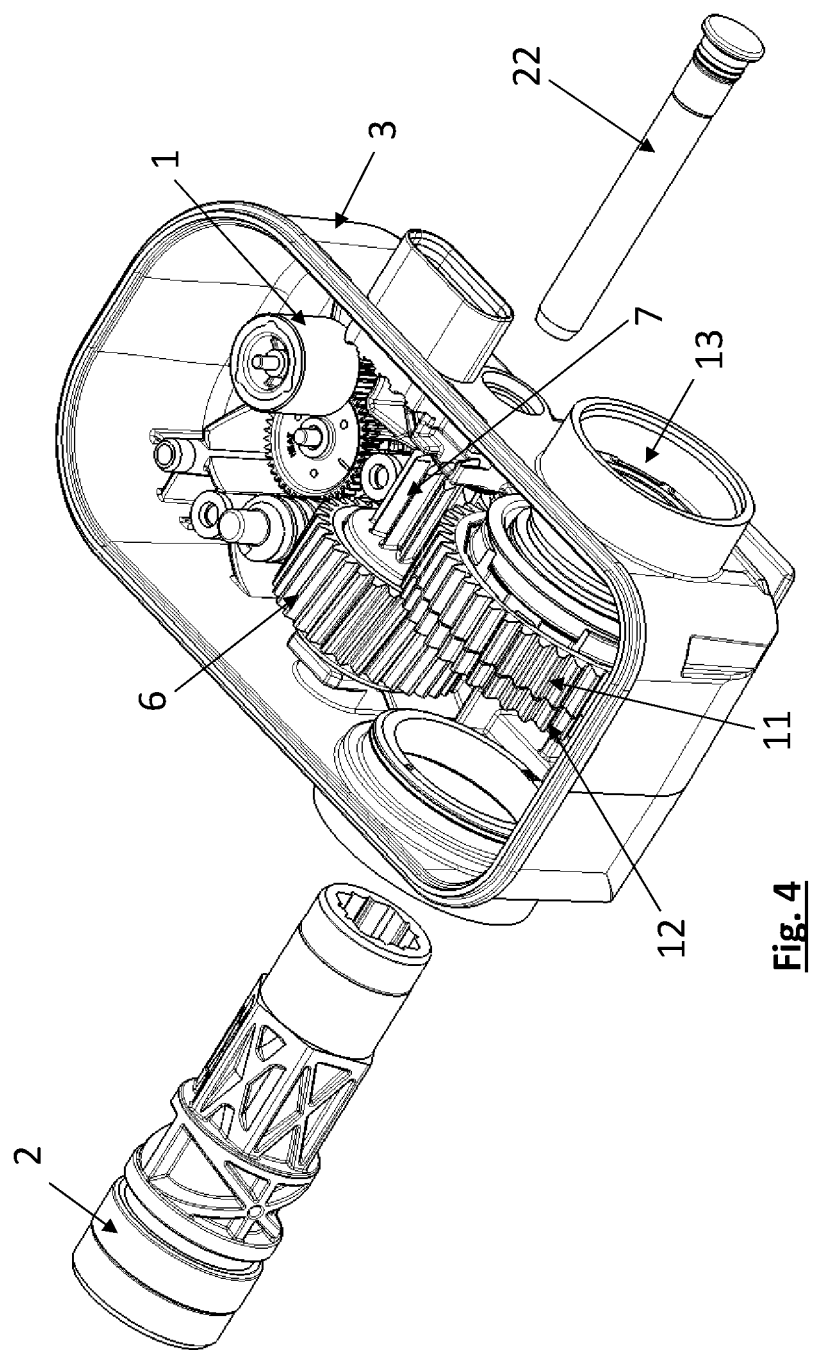
FIG. 4 illustrates three-dimensionally the installation of parts of the drive arrangement in a lower housing of FIG. 3.
Figure 5:
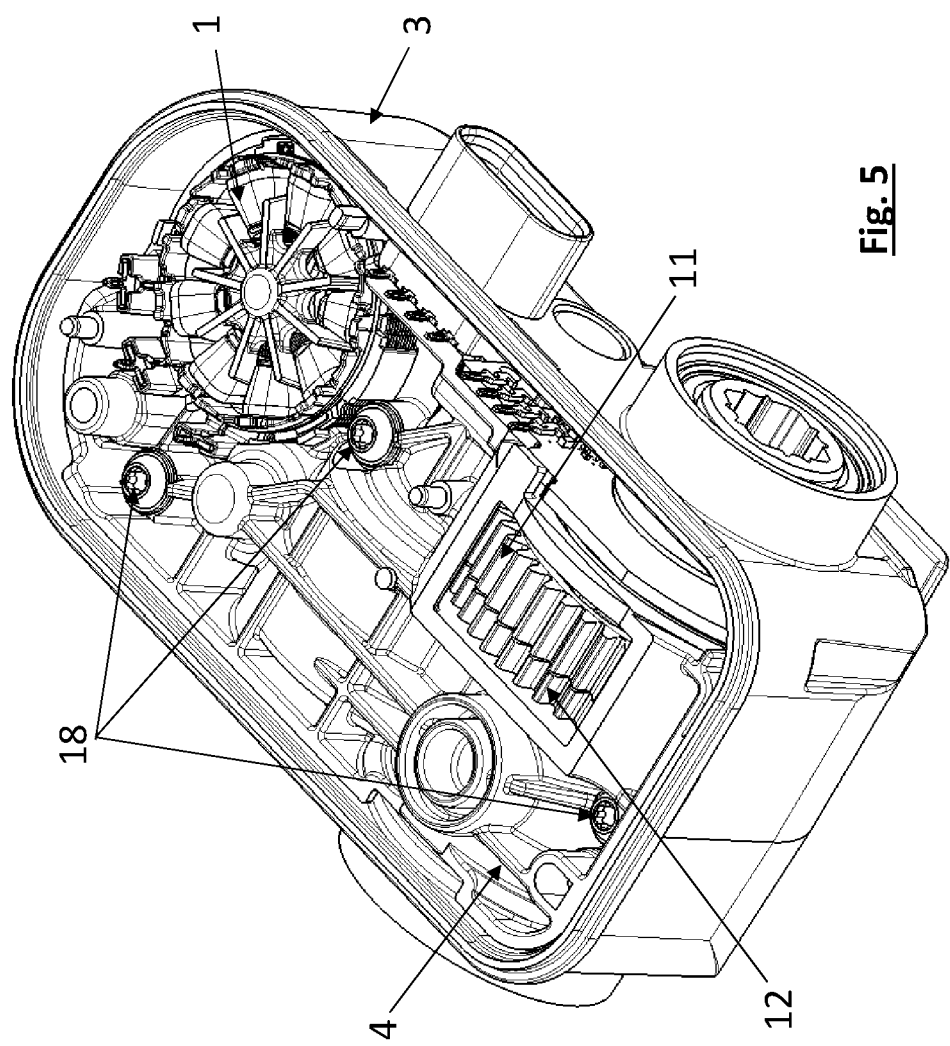
FIG. 5 illustrates three-dimensionally the lower housing of FIG. 3 with fitted parts and intermediate housing.

FIGS. 4 through 6 illustrate the lower housing 3 with the gear parts during installation. The gear mechanism of the drive is situated between two housing parts (the lower housing 3 and an intermediate housing 4) which are mechanically connected (e.g., via bolts). A cover 5 is welded onto the lower housing 3 in order to close the drive tightly.

The gear parts, minus the shaft of coupling K and minus the output shaft 2, are roughly pre-positioned by the ribs 19, 20 of the lower housing 3. A coupling shaft 22 is pressed from the outside into the lower housing 3. The output shaft 2 is pushed from the outside into the lower housing 3 and through the output wheel 11, and is held axially by the intermediate housing 4 (FIG. 5). With this design, high bearing forces, which occur for example on disengagement, are borne solely by the lower housing 3 without loading any bolts or the weld seam.

The torque is transmitted from the output wheel 11 to the output shaft 2 via a hexagonal contour on the outer periphery of the output shaft 2. The bearing points 13 with the highest load are now formed solely and fully inclusively by the lower housing 3, with corresponding advantages in relation to precision and strength.

FIG. 5 shows the drive having the cover removed. The intermediate housing 4 is bolted to the lower housing 3 via bolts 18. All housing parts and the motor 1 are held by the lower housing 3 and the intermediate housing 4. The cover 5, which is welded to the lower housing 3 at the outer edge, serves merely to seal the drive.

FIG. 6b shows a section B-B through the total drive, i.e. the drive arrangement, through the axis of the output shaft 2 as indicated in FIG. 6a.

The output shaft 2 is mounted radially in the lower housing 3 at bearing points 13. The bearing points 13 each have seals 23. A rib 21 of the intermediate housing 4 protrudes into a groove of the output shaft 2 and thus secures this in the axial direction. The cover 5 is welded to the lower housing 3 at the outer edge. The output wheel 11 with the pretension wheel 12 reaches through an opening of the intermediate housing 4 into the space between the intermediate housing 4 and the cover 5. A circuit board 24 is also arranged between the intermediate housing 4 and the cover 5, for performing angle measurements and/or angle calculations. In particular, at the circuit board 24, the rotational angle of the output wheel 11 or the contoured metal plate 17 situated thereon may be detected by measurement.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Electric motor
2 Output shaft
3 Lower housing
4 Intermediate housing
5 Cover
6 Second gear wheel
7 Third gear wheel
8 Locking contour
9 Sleeve
10 Compression spring
11 Output wheel
12 Pretension wheel
13 Bearing points
14 First gear wheel
14a First spur gear
14b Second spur gear
15 Spur gear of worm gear
16 Worm screw
17 Contoured metal plate
18 Bolt
19 Rib for output wheel
20 Rib for safety coupling
21 Rib of intermediate housing
22 Coupling shaft
23 Seal
24 Circuit board
S Self-locking gear stage
K Safety coupling

What is claimed is:

1. A drive arrangement for adjusting an aerodynamic flap of a vehicle, the drive arrangement comprising:
   an electric motor;
   a multistage gear mechanism to be driven by the electric motor, the multistage gear mechanism including spur gears and at least one self-locking gear stage to form neither a first gear stage nor a last gear stage of the multistage gear mechanism;
   an output shaft; and
   at least two housing halves to house the electric motor, the multistage gear mechanism, and the output shaft; and
   an output wheel, rotationally fixed to the output shaft, including a spring-loaded pretension wheel to protect tooth flanks of the last gear stage from impacts on fluctuating loads.

2. The drive arrangement of claim 1, wherein the self-locking gear stage forms a penultimate gear stage.

3. The drive arrangement of claim 1, further comprising a safety coupling arranged between the self-locking gear stage and the output shaft.

4. The drive arrangement of claim 3, wherein at least one gear stage is provided between the safety coupling and the output shaft.

5. The drive arrangement of claim 3, further comprising a double gear wheel including a first gear wheel and a second gear wheel coaxial to the first gear wheel, wherein the safety coupling acts between the first gear wheel and the second gear wheel.

6. The drive arrangement of claim 3, wherein the safety coupling comprises:
   a double gear wheel including a first gear wheel and a second gear wheel coaxial to the first gear wheel;
   a locking contour to connect the first gear wheel and the second gear wheel;
   a spring to press the first gear wheel and the second gear wheel against each other; and
   a sleeve which to support the first gear wheel and the second gear wheel and which is rotateable on a fixed shaft.

7. The drive arrangement of claim 1, wherein a rotation angle of the output shaft or an output wheel rotationally fixed to the output shaft, is detected by measurement.

8. The drive arrangement of claim 1, wherein bearing points of the output shaft are fully enclosed solely by one of the at least two housing halves.

9. The drive arrangement of claim 1, wherein at least one gear shaft of a gear stage is pressed into one housing half and all radial forces acting on the shaft are soley borne by this housing part.

10. The drive arrangement of claim 9, wherein the one housing halve of the at least two housing halves in which the at least one gear shaft is pressed is the same as that which supports the output shaft.

11. A drive arrangement for adjusting an aerodynamic flap of a vehicle, the drive arrangement comprising:
   an electric motor;
   a multistage gear mechanism to be driven by the electric motor, the multistage gear mechanism including spur gears and at least one self-locking gear stage to form neither a first gear stage nor a last gear stage of the multistage gear mechanism;
   a safety coupling arranged between the self-locking gear stage and the output shaft;
   a double gear wheel including a first gear wheel and a second gear wheel coaxial to the first gear wheel, wherein the safety coupling acts between the first gear wheel and the second gear wheel; and
   an output shaft.

12. The drive arrangement of claim 11, wherein the self-locking gear stage forms a penultimate gear stage.

13. The drive arrangement of claim 11, wherein at least one gear stage is provided between the safety coupling and the output shaft.

14. The drive arrangement of claim 11, further comprising a housing to house the electric motor, the multistage gear mechanism, the safety coupling, the double gear wheel, and the output shaft.

15. The drive arrangement of claim 14, wherein bearing points of the output shaft are fully enclosed solely by the housing.

16. The drive arrangement of claim 14, wherein at least one gear shaft of a gear stage is pressed fit into the housing such that all radial forces acting on the shaft are soley borne by the housing.

17. A drive arrangement for adjusting an aerodynamic flap of a vehicle, the drive arrangement comprising:

- a multistage gear mechanism including spur gears and at least one self-locking gear stage to form neither a first gear stage nor a last gear stage of the multistage gear mechanism;
- an output shaft; and
- a safety coupling arranged between the self-locking gear stage and the output shaft, the safety coupling including:
  - a double gear wheel including a first gear wheel and a second gear wheel coaxial to the first gear wheel;
  - a locking contour to connect the first gear wheel and the second gear wheel;
  - a spring to press the first gear wheel and the second gear wheel against each other; and
  - a rotateable sleeve which to support the first gear wheel and the second gear wheel.

\* \* \* \* \*